US010423361B2

(12) United States Patent
Badam et al.

(10) Patent No.: US 10,423,361 B2
(45) Date of Patent: Sep. 24, 2019

(54) VIRTUALIZED OCSSDS SPANNING PHYSICAL OCSSD CHANNELS

(71) Applicant: Microsoft Technology Licensing, LLC, Redmond, WA (US)

(72) Inventors: Anirudh Badam, Issaquah, WA (US); Badriddine Khessib, Redmond, WA (US); Laura Marie Caulfield, Woodinville, WA (US); Mihail Gavril Tarta, Sammamish, WA (US); Robin Andrew Alexander, Woodinville, WA (US); Xiaozhong Xing, Bellevue, WA (US); Zhe Tan, Redmond, WA (US); Jian Xu, La Jolla, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 83 days.

(21) Appl. No.: 15/850,578

(22) Filed: Dec. 21, 2017

(65) Prior Publication Data
US 2019/0196748 A1 Jun. 27, 2019

(51) Int. Cl.
*G06F 3/06* (2006.01)
*G06F 9/455* (2018.01)
*G06F 9/54* (2006.01)

(52) U.S. Cl.
CPC .......... *G06F 3/0667* (2013.01); *G06F 3/0613* (2013.01); *G06F 3/0631* (2013.01);
(Continued)

(58) Field of Classification Search
CPC ...... G06F 3/068; G06F 3/0659; G06F 3/0616; G06F 3/061; G06F 3/0667; G06F 3/0688;
(Continued)

(56) References Cited

U.S. PATENT DOCUMENTS 7,620,775 B1 * 11/2009 Waxman .............. G06F 3/0626
709/218
9,442,866 B1 * 9/2016 Post .................... G06F 13/1615
(Continued)

OTHER PUBLICATIONS

Ouyang, Jian et al., "SDF: Software-Defined Flash for Web-Scale Internet Storage Systems", In Proceedings of 19th international conference on Architectural support for programming languages and operating systems, Mar. 1, 2014, http://dx.doi.org/10.1145/2541940.2541959, 14 Pages.
(Continued)

*Primary Examiner* — Mano Padmanabhan
*Assistant Examiner* — Jean C Edouard
(74) *Attorney, Agent, or Firm* — Buckley, Maschoff & Talwalkar LLC

(57) ABSTRACT

A system includes reception of a request from a first application to create a virtual open-channel solid state drive associated with a first bandwidth and first capacity, association, in response to the request, of block addresses of a virtual address space of the first application with block addresses of one or more blocks of a first one of a first plurality of channels of a first open-channel solid state drive and with block addresses of one or more blocks of a second one of a second plurality of channels of a second open-channel solid state drive, reception, from the first application, of a first I/O call associated with one or more block addresses of the virtual address space, determination of block addresses of one or more blocks of the first one of the first plurality of channels which are associated with the one or more block addresses of the virtual address space, and execution of the first I/O call on the determined block addresses of one or more blocks of the first one of the first plurality of channels.

20 Claims, 7 Drawing Sheets

(52) U.S. Cl.
CPC .............. *G06F 9/455* (2013.01); *G06F 9/545* (2013.01); *G06F 2009/45587* (2013.01); *G06F 2009/45595* (2013.01)

(58) Field of Classification Search
CPC .... G06F 3/0613; G06F 3/0631; G06F 3/0656; G06F 3/0661; G06F 9/455; G06F 9/545; G06F 12/00; G06F 12/0669; G06F 12/02; G06F 2009/45595; G06F 2009/45587
USPC ......................................................... 711/203
See application file for complete search history.

(56) References Cited

U.S. PATENT DOCUMENTS

| | | | | |
|---|---|---|---|---|
| 2008/0140945 | A1* | 6/2008 | Salessi | G06F 3/061 711/148 |
| 2012/0066450 | A1* | 3/2012 | Yochai | G06F 3/0605 711/114 |
| 2012/0079170 | A1* | 3/2012 | Chang | G06F 12/0246 711/103 |
| 2013/0097369 | A1* | 4/2013 | Talagala | G06F 12/0246 711/103 |
| 2013/0191601 | A1* | 7/2013 | Peterson | G06F 12/0868 711/137 |
| 2015/0248922 | A1* | 9/2015 | Hyun | G11C 16/16 365/218 |
| 2016/0092116 | A1* | 3/2016 | Liu | G11C 5/025 711/103 |
| 2017/0344285 | A1* | 11/2017 | Choi | G06F 3/0619 |
| 2018/0011762 | A1* | 1/2018 | Klein | G06F 11/1072 |
| 2018/0260148 | A1* | 9/2018 | Klein | G06F 3/0619 |
| 2018/0262567 | A1* | 9/2018 | Klein | H04L 67/1097 |

OTHER PUBLICATIONS

Huang, Ronnie "Open-Channel SSDs and Host-Based FTLs", Flash Memory Summit, 2016, (pp: 1-14, 14 total pages).

Bjorling, Matias et al. "LightNVM: The Linux Open-Channel SSD Subsystem", Proceedings of the 15th USENIX Conference on File and Storage Technologies (FAST '17), USENIX Association, 2017, ISBN: 978-1-931971-36-2, (pp: 359-373, 15 total pages).

Bjorling, Matias "Open-Channel SSDs", LinuxCon North America, 2015, (pp: 1-16, 16 total pages).

Bjoring, Matias "Open-Channel Solid States Drives", Linux Software Foundation Vault, 2016, CNEX Labs, (pp: 1-38, 38 total pages).

* cited by examiner

VIRTUALIZED OCSSDS SPANNING PHYSICAL OCSSD CHANNELS

BACKGROUND

Solid-state drives (SSDs) are increasingly used to serve cloud and client workloads. Traditionally, an application accesses a SSD via a page-based filesystem Application Programming Interface (API) provided by an operating system. A block layer of the operating system then issues corresponding block-based commands to the SSD. The commands are received by a flash translation layer of the SSD, which executes the commands on the SSD hardware in a flash-efficient manner. The multiple software layers lying between the application and the SSD hardware contribute significantly to transaction overhead, particularly as compared to the fast access speeds of SSDs.

The above-described traditional architecture allows multiple applications to access storage across several SSD channels. SSD storage is presented to each application as a file (i.e., a virtual hard drive) to which any available SSD storage unit can be allocated and from which any available SSD storage unit can be deallocated rather seamlessly. Bandwidth consumption per application may be controlled by software-based file throttling mechanisms. Again, however, the software layers of the architecture result in poor performance.

Open-channel solid-state drives (OCSSDs) provide increased efficiency and performance by allowing OCSSD-compatible applications to directly access SSD hardware, without the intervening software layers of the traditional architecture. However, the number of applications that can access a set of OCSSDs is limited by the number of actual physical channels provided by the OCSSDs. Assuming a data server includes four identical OCSSDs and each OCSSD includes eight channels, the server can support a maximum of thirty-two applications. Each of the thirty-two applications would receive the same amount of storage and same level of performance/bandwidth.

What is needed is a system to virtualize OCSSDs across multiple physical OCSSD channels, while efficiently providing security isolation and performance isolation.

DETAILED DESCRIPTION

The following description is provided to enable any person in the art to make and use the described embodiments. Various modifications, however, will remain readily apparent to those in the art.

Generally, some embodiments provide an efficient system-level solution for virtualizing OCSSDs across multiple physical OCSSD channels while ensuring security and performance isolation. Security isolation requires that one application is prevented from accessing OCSSD storage allocated to another application, and performance isolation dictates that the bandwidth and capacity consumption of one application does not affect the ability of another application to use its allocated bandwidth and capacity. Embodiments may therefore allow multiple (e.g., hundreds) of applications to share limited (e.g., eight) OCSSDs while also experiencing the performance benefits of OCSSDs.

Some embodiments address the technical problem of efficiently sharing SSD hardware resources among applications. A technical solution to the technical problem, according to some embodiments, includes providing software and/or hardware logic to create virtualized OCSSDs spanning physical OCSSD channels and to provide applications with efficient access thereto.

Figure 1:
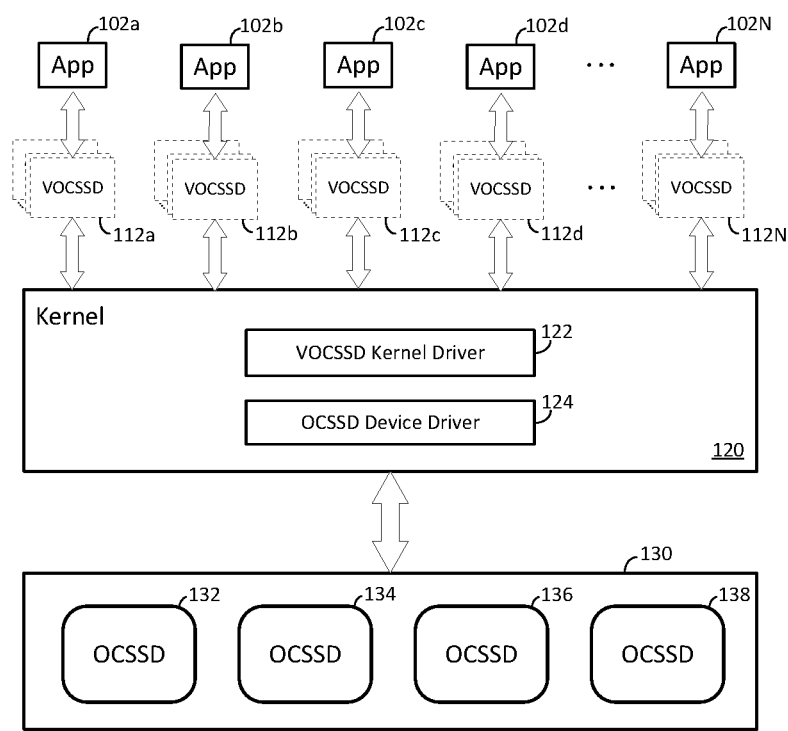
FIG. 1 is a block diagram of a system architecture to provide virtual open-channel SSDs to applications according to some embodiments.

FIG. 1 is a block diagram of an architecture to provide virtual open-channel SSDs to applications according to some embodiments. The FIG. 1 architecture may be implemented using any number of suitable computing devices and networks.

Applications 102a through 102N may comprise processor-executable program code executed by one or more application servers or other suitable devices. According to some embodiments, applications 102a through 102N may be executed by one or more application servers to provide functionality to remote client devices (not shown). One or more of applications 102a through 102N may be executed within a dedicated virtual machine provided by a server as is known in the art.

Each of applications 102a through 102N requires access to data storage hardware. The data storage hardware may be used to store any data used by an application, including but not limited to key-value stores, indexes, and multi-dimensional data stores. As shown, some embodiments expose one or more private logical OCSSDs (i.e., virtual OCSSDs, or VOCSSDs) to each application.

In particular, each one of applications 102a through 102N communicates with a respective set of VOCSSDs 112a through 112N. A set of VOCSSDs 112a through 112N may include one or more VOCSSDs. Each VOCSSD of a set of VOCSSDs 112a through 112N represents physical resources of one or more of OCSSDs 132 through 138 of data storage array 130.

As is known in the art, each of OCSSDs 132 through 138 comprises a Flash-based memory device including a number of data channels, a number of dies within each channel, a number of planes within each die, and a number of blocks within each die. OCSSDs differ from a traditional SSD in that they expose the physical storage units of the SSD to the host without an intervening flash translation layer. The host may therefore manage data placement, I/O scheduling, wear-levelling, garbage collection, and/or other functions previously performed by the flash translation layer.

A data storage array 130 according to some embodiments is not limited to four OCSSDs. Also, the number of applications which are contemporaneously served by an architecture according to some embodiments may far outnumber the number of underlying OCSSDs (e.g., by a ratio of 50-to-1).

According to some embodiments, and in contrast to conventional systems, any VOCSSD of VOCSSDs 112a through 112N may virtualize blocks located within die of any two or more channels of OCSSDs 132 through 138. For example, a VOCSSD of VOCSSDs 112a virtualizes blocks located within die of two channels of a same OCSSD. In another example, a VOCSSD of VOCSSDs 112c may virtualize blocks located on a die of a channel of OCSSD 132 and blocks located on a die of a channel of OCSSD 138. Application 102a, which issues page-addressed calls to read, write and erase blocks of the VOCSSD of VOCSSDs 112c, therefore causes reading, writing and erasing of the physical blocks located on the die of the channel of OCSSD 132 and the physical blocks located on the die of the channel of OCSSD 138. The access to OCSSD 132 and OCSSD 138 is transparent to application 102, which issues the read, write and erase calls with respect to its own virtual address space and not with respect to the addresses of the actual physical block.

Each VOCSSD of FIG. 1 is depicted using a dashed line. The dashed line represents logical virtualized storage. An application's calls to an associated VOCSSD are received and executed by kernel 120 according to some embodiments. Kernel 120 comprises an operating system kernel of a data server associated with data storage array 130. The data server may be located remotely from array 130 or within a same physical chassis.

Kernel 120 includes VOCSSD kernel driver 122. According to some embodiments, kernel driver 122 receives requests for OCSSD capacity and bandwidth from applications 102a through 102N. Based on the requests, VOCSSD kernel driver 122 maps virtual block addresses of each application's address space to physical block addresses within the OCSSDs of array 130. VOCSSD kernel driver 122 uses the mapping associated with an application to determine physical OCSSD block addresses which correspond to any read, write and erase calls received from the application. VOCSSD kernel driver 122 thereby provides security isolation by ensuring that an application only reads or writes to a physical OCSSD block which has been allocated to the application, and that no application reads or writes to a physical OCSSD block which has been allocated to another application via a mapping.

A request for OCSSD capacity and bandwidth received by VOCSSD kernel driver 122 may specify a number of blocks, and a number of channels and a number of dies across which the blocks should be striped. The number of blocks represents the requested capacity, and the number of channels and dies is directly proportional to the bandwidth. VOCSSD kernel driver 122 thereby also provides performance isolation because, once allocated via a mapping, the bandwidth and capacity consumption of one application does not affect another application's ability to use its allocated bandwidth and capacity.

As described above, kernel driver 122 maps calls received from an application to physical block addresses of OCSSDs 132 through 138. The mapped calls are provided to OCSSD device driver 124, which passes the calls to storage array 130 and receives output therefrom via a suitable interface as is known in the art. According to some embodiments, the interface conforms to the NVMe specification or a subset thereof.

Figure 2:
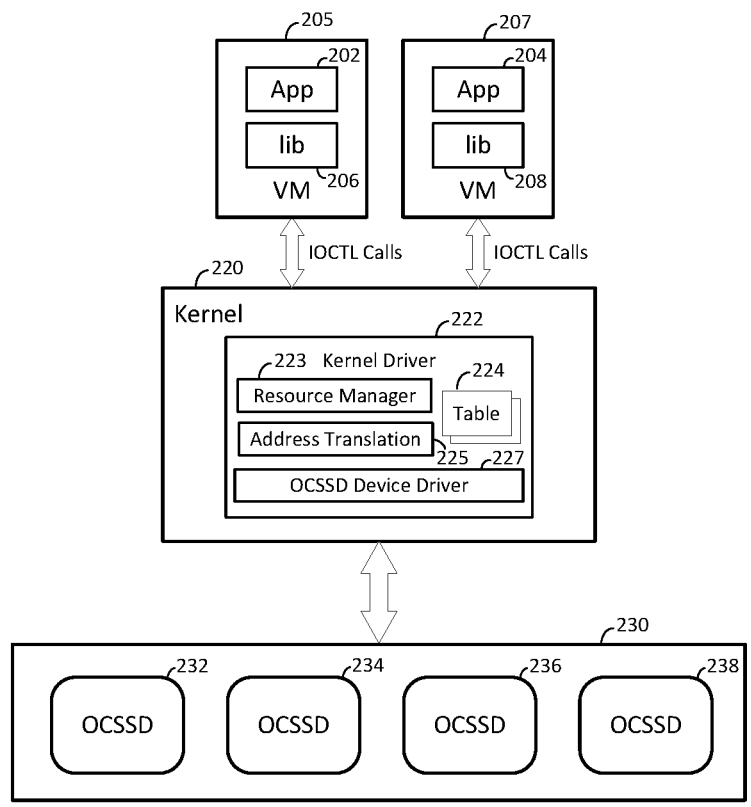
FIG. 2 is a block diagram of a system architecture to provide a virtual open-channel SSD to an application according to some embodiments.

FIG. 2 illustrates an implementation of the FIG. 1 architecture according to some embodiments. Applications 202 and 204 are executed within respective virtual machines 205 and 207. Virtual machines 205 and 207 may be provided by one or two application servers.

Applications 202 and 204 employ software libraries 206 and 208 to call a block-address based storage interface provided by kernel driver 222 of kernel 220. For example, application 202, using library 206, may call an IOCTL interface to create a VOCSSD according to some embodiments. The call may specify an allocation policy consisting of a number of blocks, a number of channels, and a number of die. Resource manager 223 of kernel driver 222 may implement the interface to determine a set of physical blocks of OCSSDs 232 through 238 which satisfy the allocation policy, and to generate a table 224 which maps the virtual address space of application 202 (e.g., 0-64 Gb) to the physical addresses of the determined blocks.

Similarly, application 204 may use library 208 to call the IOCTL interface to create a VOCSSD associated with application 204. The call may specify a second allocation policy consisting of a second number of blocks, number of channels, and number of die. In response to the call, resource manager 223 determines second physical blocks of OCSSDs 232 through 238 which satisfy the second allocation policy, and generates a second table 224 which is associated with application 204. The second table 224 maps the virtual address space of application 204 (e.g., 0-32 Gb) to the physical addresses of the determined second blocks. Tables 224 may be stored in a cache or other volatile memory of data server 220 for fast access thereto.

Once a VOCSSD has been generated for an application, the application may issue IOCTL calls which refer to block addresses of the application's virtual address space. Address translation component 225 of kernel driver 222 receives such calls and uses the table 224 corresponding to the application to maps the calls to physical block addresses of OCSSDs 232 through 238. The mapped calls are provided to OCSSD device driver 227, which in turn calls a suitable interface provided by storage array 230 to execute the calls. OCSSD device driver 227 is a component of kernel driver 222 in the FIG. 2 architecture, but embodiments are not limited thereto. According to some embodiments, the calls may operate directly on the blocks of OCSSDs 232 through 238 rather than utilizing any flash translation layer of OCSSDs 232 through 238.

Figure 3:
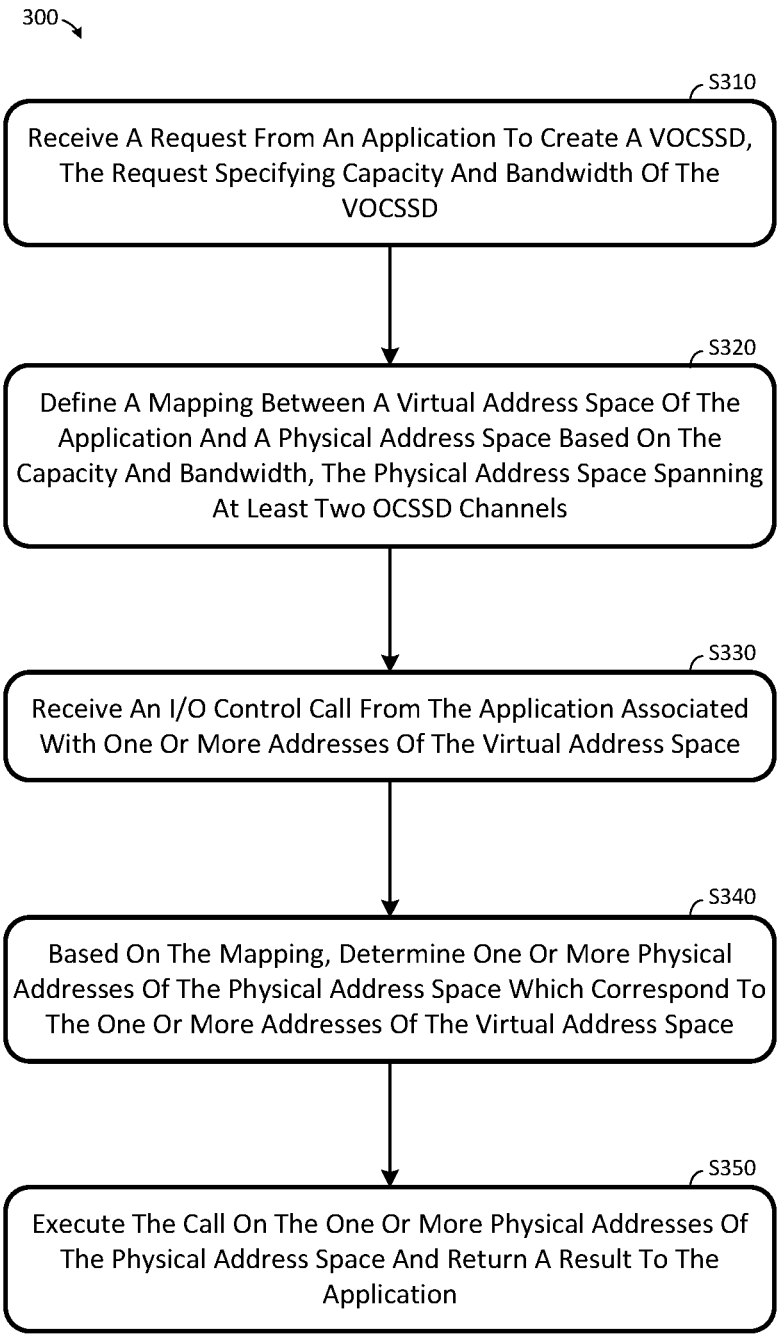
FIG. 3 is a flow diagram of a process to create and utilize a virtual open-channel SSD according to some embodiments.

FIG. 3 comprises a flow diagram of process 300 to create and utilize a virtual open-channel SSD according to some embodiments. In some embodiments, a processing unit (e.g., one or more processors, processing cores, processor threads, etc.) of a data server executes software program code to cause the data server to perform process 300. Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to process 300, an application transmits a request to create a VOCSSD. As described above, the application may transmit the request by using a VOCSSD-supporting library to call an application programming interface of a kernel driver of a data server.

The request is received from the application at 5310. The request may specify a storage capacity and a bandwidth of the desired VOCSSD. According to some embodiments, the storage capacity may be expressed in bytes, blocks or any other suitable unit of storage capacity. The bandwidth may be represented by a number of channels and a number of dies across which the storage capacity should be allocated. One example of the syntax of the request is IOCTL_CREATE_VOCSSD (size_in_blocks, num_channels, num_die), but embodiments are not limited thereto. The request may specify other configuration information, including information related to fault-tolerance, such as a number of physical OCSSDs, a number of data servers and/or a number of storage arrays across which the storage capacity should be allocated.

Next, at 5320, a mapping is defined between a virtual address space of the application and a physical address space of one or more OCSSDs. The physical address space is determined based on the bandwidth and capacity specified in the request, and may span at least two OCSSD channels. According to some embodiments, S320 is executed by resource manager 223 of kernel driver 222 and the mapping comprises a table 224. Resource manager 223 may use table metadata to associate the table 224 with the application from which the request was received, for example.

An I/O control call is received from the application at 5330. The I/O control call may comprise a system call requesting device-specific I/O operations from kernel 220. The I/O control call is associated with one or more addresses of the virtual address space. The application issues the I/O control call in order to read from and write to the VOCSSD during application execution. According to some embodiments, the application may utilize the aforementioned library to call a read interface (e.g., IOCTL_READ_SECTOR (virtual_sector_address)), a write interface (e.g., IOCTL_WRITE_PAGE (virtual_page_address)) and/or and erase interface (e.g., IOCTL_ERASE_BLOCK (virtual_block_address)) implemented by the kernel driver.

According to some embodiments, address translation component 225 of kernel driver 222 receives the I/O control call at 5330 and determines one or more physical addresses of the physical address space at 5340. The one or more physical addresses are determined based on the mapping, and correspond to the one or more addresses of the virtual address space specified in the received call. The call is executed on the one or more physical addresses at 5350, and a result is returned to the application. According to some embodiments, OCSSD device driver 227 calls a suitable interface provided by storage array 230 to execute the call on the one or more physical addresses of OCSSDs 232 through 238.

Process 300 may be executed with respect to many applications in parallel. Such execution may result in the creation of a mapping table corresponding to each application, with each mapping table mapping between the virtual address space of a respective application and a physical address space of dedicated physical blocks which are allocated to the application and may span two or more OCSSD channels.

As mentioned above, some embodiments leverage the ability of an OCSSD to allow direct access to its physical blocks, without an intervening flash translation layer. Some embodiments of a kernel driver and/or an OCSSD device driver may therefore perform flash-related functions such as wear-leveling, garbage collection and write amplification reduction. For example, the kernel driver may allocate less-worn blocks to more aggressive applications and/or may periodically change pointers within a mapping table to point to different physical blocks which also meet the capacity and bandwidth requirements associated with the mapping table.

FIGS. 4 through 7 illustrate variations of the above-described architecture according to some embodiments. Embodiments are not limited to the architectures of FIGS. 4 through 7.

Figure 4:
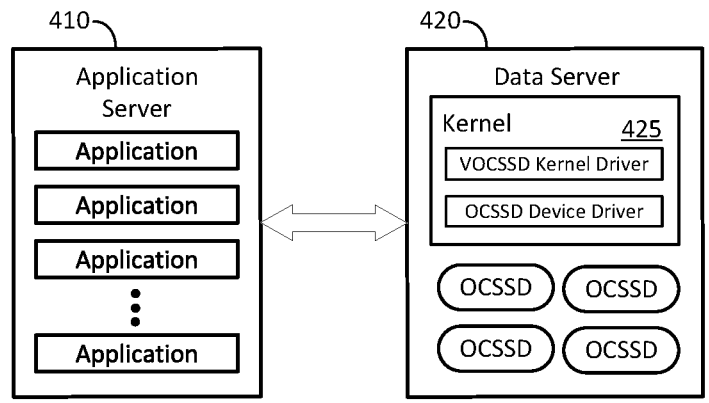
FIG. 4 is a block diagram of a system architecture including a data server including physical open-channel SSDs and providing virtual open-channel SSDs to applications executing on an application server according to some embodiments.

FIG. 4 illustrates application server 410 executing a plurality of applications. One or more of the applications of application server 410 may read from and write to OCSSDs of data server 420 via a dedicated VOCSSD provided by kernel 425 of data server 420 as described above. Each dedicated VOCSSD may provide access to physical blocks of different channels of one or more of the OCSSDs of data server 420. Data server 420 may similarly and contemporaneously serve data to one or more applications executing on one or more other application servers. As described above, the VOCSSDs are allocated and served in a manner which ensures security and performance isolation between all of the applications accessing the OCSSDs of data server 420.

Figure 5:
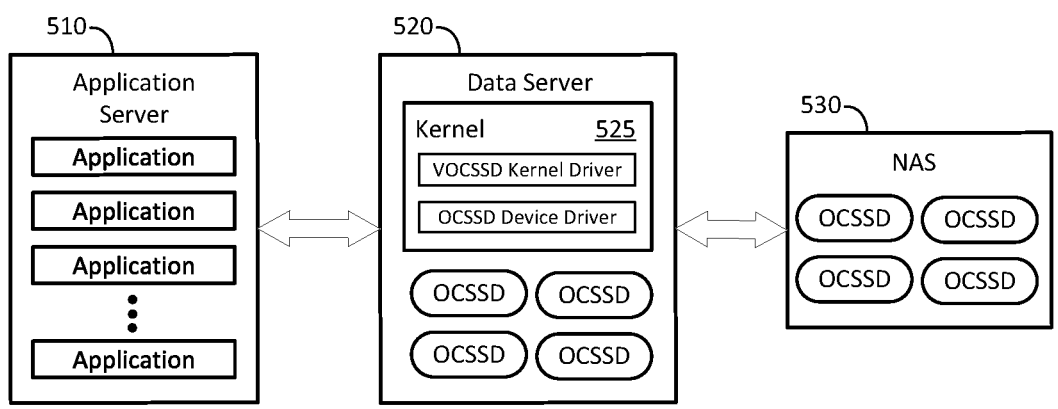
FIG. 5 is a block diagram of a system architecture including a data server including physical open-channel SSDs and providing virtual open-channel SSDs to applications executing on an application server according to some embodiments.

FIG. 5 illustrates application server 510 executing a plurality of applications which read data from and write data to data server 520 as described above. Data server 520 is in communication with remote network-attached storage device 530, including an array of OCSSDs. According to some embodiments, a VOCSSD provided by data server 520 may include physical blocks from one or more channels of the OCSSDs of data server 520 and/or from one or more channels of the OCSSDs of network-attached storage 530. Therefore, a mapping table generated by kernel 525 in association with an application may map virtual addresses of the application to physical block addresses of any of the OCSSDs of data server 520 and any of the OCSSDs of network-attached storage 530. Embodiments may include any number of externally-located OCSSDs from which blocks may be allocated to a single VOCSSD.

Figure 6:
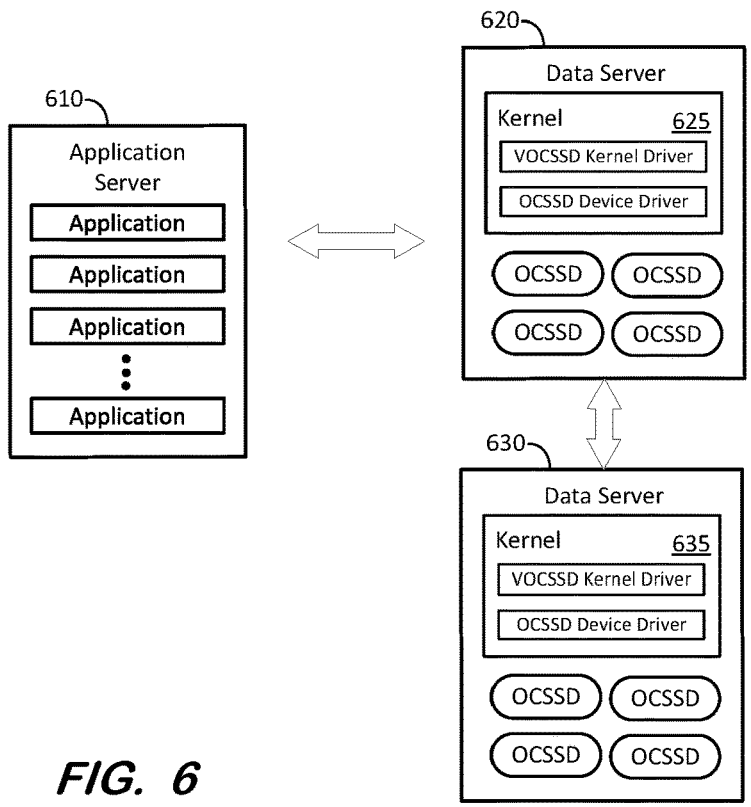
FIG. 6 is a block diagram of a system architecture including two data servers including physical open-channel SSDs and providing virtual open-channel SSDs to applications executing on an application server according to some embodiments.

FIG. 6 illustrates distributed resource management according to some embodiments. Upon receiving a request from an application of application server 610 to create a VOCSSD as described above, kernel 625 of data server 620 may communicate with kernel 635 to map block addresses of the OCSSDs of data server 630 and block addresses of the OCSSDs of data server 620 to the virtual addresses of the VOCSSD. Such a mapping may occur if the request specifies that blocks of the VOCSSD should span multiple data servers.

Figure 7:
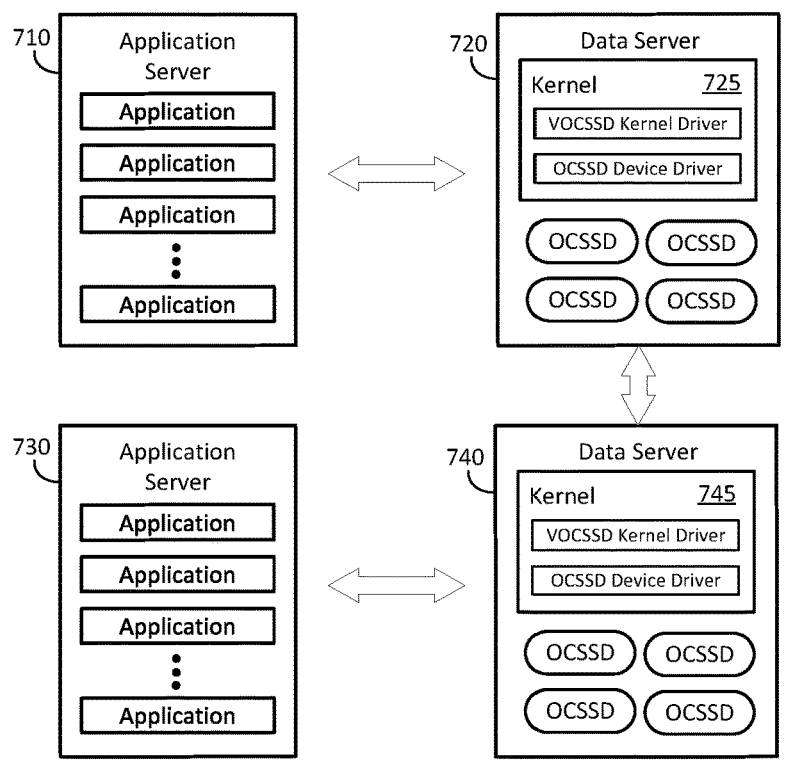
FIG. 7 is a block diagram of a system architecture including two data servers including physical open-channel SSDs and providing virtual open-channel SSDs to applications executing on two application servers according to some embodiments.

FIG. 7 is similar to FIG. 6 in that VOCSSDs associated with applications of application server 710 may be associated with physical blocks located in data server 720 and/or data server 740. Also similarly, an application of application server 730 may transmit a request to create a VOCSSD to kernel 745 of server 740. In response, kernel 745 of data server 740 may communicate with kernel 725 to map block addresses of the OCSSDs of data server 720 as well as block addresses of the OCSSDs of data server 740 to the virtual addresses of the VOCSSD.

Figure 8:
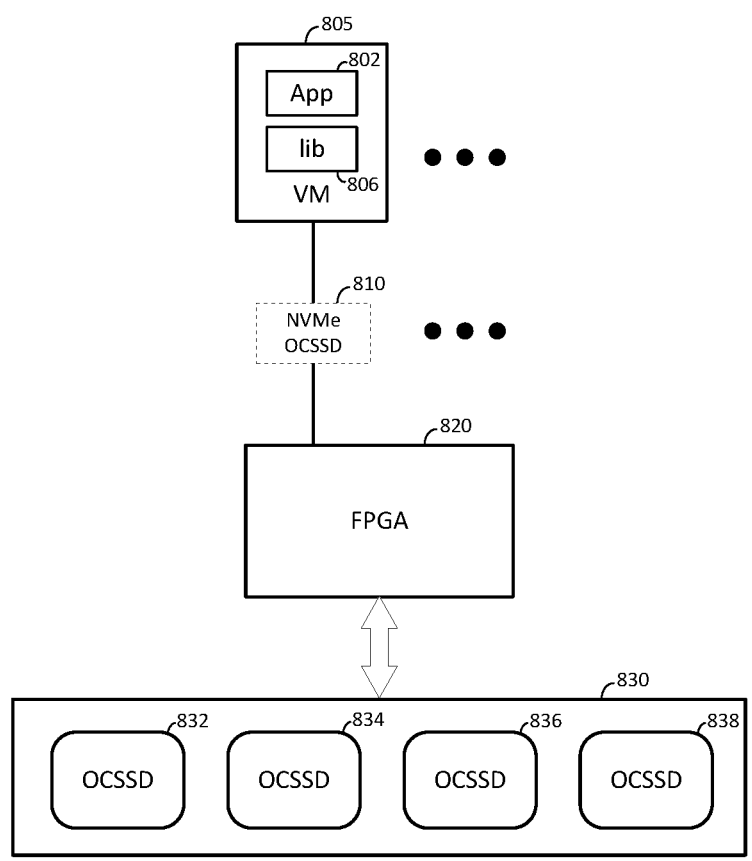
FIG. 8 is a block diagram of a system architecture to provide virtual open-channel SSDs to applications according to some embodiments.

FIG. 8 illustrates a hardwired implementation of the logic of the above-described VOCSSD kernel driver. In particular, FPGA 820 performs the functions attributed above to a VOCSSD kernel driver. Such a hardware implementation may introduce less latency than a software implementation of the VOCSSD kernel driver. Any suitable one or more other hardware logic devices may be used in place of FPGA 820. According to some embodiments, FPGA 820 acts as a SR-IOV target, providing PCI virtualization to a privileged device.

Figure 9:
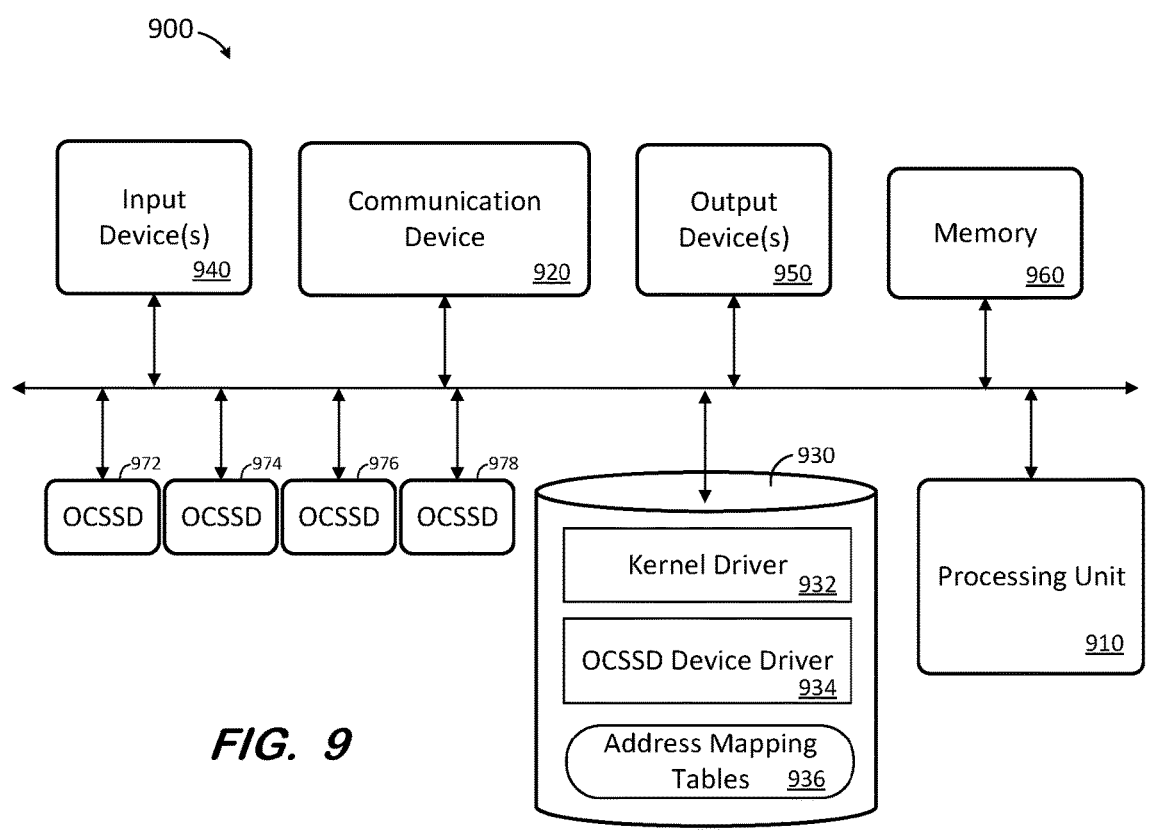
FIG. 9 is a block diagram of data server including physical open-channel SSDs and providing virtual open-channel SSDs according to some embodiments.

FIG. 9 is a block diagram of system 900 according to some embodiments. System 900 may comprise a general-purpose data server and may execute program code to perform any of the functions described herein. System 900 may include other unshown elements according to some embodiments.

System 900 includes processing unit 910 operatively coupled to communication device 920, data storage system 930, one or more input devices 940, one or more output devices 950, volatile memory 960 and OCSSDs 972 through 978. Processing unit 910 may comprise one or more processors, processing cores, etc. for executing program code. Communication device 920 may facilitate communication with external devices, such as remote application servers and data servers. Input device(s) 940 may comprise, for example, a keyboard, a keypad, a mouse or other pointing device, a microphone, a touch screen, and/or an eye-tracking device. Output device(s) 950 may comprise, for example, a display (e.g., a display screen), a speaker, and/or a printer.

Data storage system 930 may comprise any number of appropriate persistent storage devices, including combinations of magnetic storage devices (e.g., magnetic tape, hard disk drives and flash memory), optical storage devices, Read Only Memory (ROM) devices, etc. Memory 960 may comprise Random Access Memory (RAM), Storage Class Memory (SCM) or any other fast-access memory. OCSSDs 972 through 978 may comprise a commonly-managed array of OCSSDs as known in the art.

Kernel driver 932 and OCSSD device driver 934 may comprise program code executed by processing unit 910 to cause system 900 to perform any one or more of the processes described herein. In this regard, address mapping tables 936 may store mappings between virtual addresses of client applications and channel-spanning physical block addresses of OCSSDs 972 through 978 as described herein. Data storage device 930 may also store data and other program code for providing additional functionality and/or which are necessary for operation of system 900, such as other device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
a first open-channel solid state drive comprising a first plurality of channels, each of the first plurality of channels comprising a respective plurality of blocks;
a second open-channel solid state drive comprising a second plurality of channels, each of the second plurality of channels comprising a respective plurality of blocks; and
a data server comprising a processing unit to execute program code to cause the data server to:
associate block addresses of a virtual address space of a first application with block addresses of one or more blocks of a first one of the first plurality of channels and with block addresses of one or more blocks of a first one of the second plurality of channels;
receive, from the first application, a first I/O call associated with one or more block addresses of the virtual address space;
determine block addresses of one or more blocks of the first one of the first plurality of channels which are associated with the one or more block addresses of the virtual address space; and
execute the first I/O call on the determined block addresses of one or more blocks of the first one of the first plurality of channels.

2. A system according to claim 1, wherein the processing unit is to execute program code to cause the data server to:
receive, from the first application, a second I/O call associated with a second one or more block addresses of the virtual address space;
determine block addresses of one or more blocks of the one of the first one of the second plurality of channels which are associated with the second one or more block addresses of the virtual address space; and
execute the second I/O call on the determined block addresses of one or more blocks of the first one of the second plurality of channels.

3. A system according to claim 1, wherein the second open-channel solid state drive is located remote from the first open-channel solid state drive.

4. A system according to claim 1, wherein the processing unit is to execute program code to cause the data server to:
receive, from the first application, a second I/O call associated with a second one or more block addresses of the virtual address space;
determine block addresses of a second one or more blocks of the first one of the first plurality of channels which are associated with the second one or more block addresses of the virtual address space; and
execute the second I/O call on the determined block addresses of the second one or more blocks of the first one of the first plurality of channels.

5. A system according to claim 1, wherein the processing unit is to execute program code to cause the data server to:
associate block addresses of a virtual address space of a second application with block addresses of a second one or more blocks of a second one of the first plurality of channels and with block addresses of a second one or more blocks of a second one of the second plurality of channels;

receive, from the second application, a second I/O call associated with one or more block addresses of the virtual address space of the second application;

determine block addresses of one or more blocks of the second one of the first plurality of channels which are associated with the one or more block addresses of the virtual address space of the second application; and execute the second I/O call on the determined block addresses of one or more blocks of the second one of the first plurality of channels which are associated with the one or more block addresses of the virtual address space of the second application.

6. A system comprising:

a first open-channel solid state drive comprising a first plurality of channels, each of the first plurality of channels comprising a respective plurality of blocks; a second open-channel solid state drive comprising a second plurality of channels, each of the second plurality of channels comprising a respective plurality of blocks; and a data server comprising a processing unit to execute program code to cause the data server to:

associate block addresses of a virtual address space of a first application with block addresses of one or more blocks of a first one of the first plurality of channels and with block addresses of one or more blocks of a second one of the first plurality of channels;

receive, from the first application, a first I/O call associated with one or more block addresses of the virtual address space;

determine block addresses of one or more blocks of the first one of the first plurality of channels which are associated with the one or more block addresses of the virtual address space; and execute the first I/O call on the determined block addresses of one or more blocks of the first one of the first plurality of channels.

7. A system according to claim 6, wherein the processing unit is to execute program code to cause the data server to:

associate block addresses of the virtual address space of the first application with block addresses of one or more blocks of the first one of the first plurality of channels, with block addresses of one or more blocks of the second one of the first plurality of channels, and with block addresses of one or more blocks of one of the second plurality of channels.

8. A system according to claim 7, wherein the processing unit is to execute program code to cause the data server to:

receive, from the first application, a second I/O call associated with a second one or more block addresses of the virtual address space;

determine block addresses of one or more blocks of the one of the second plurality of channels which are associated with the second one or more block addresses of the virtual address space; and execute the second I/O call on the determined block addresses of one or more blocks of the one of the second plurality of channels.

9. A system according to claim 8, wherein the second open-channel solid state drive is located remote from the first open-channel solid state drive.

10. A system according to claim 6, wherein the processing unit is to execute program code to cause the data server to:

receive, from the first application, a second I/O call associated with a second one or more block addresses of the virtual address space;

determine block addresses of one or more blocks of a second one of the first plurality of channels which are associated with the second one or more block addresses of the virtual address space; and execute the second I/O call on the determined block addresses of one or more blocks of the second one of the first plurality of channels.

11. A system according to claim 6, wherein the processing unit is to execute program code to cause the data server to:

associate block addresses of a virtual address space of a second application with block addresses of a second one or more blocks of the first one of the first plurality of channels and with block addresses of a second one or more blocks of the second one of the first plurality of channels;

receive, from the second application, a second I/O call associated with one or more block addresses of the virtual address space of the second application;

determine block addresses of one or more blocks of the first one of the first plurality of channels which are associated with the one or more block addresses of the virtual address space of the second application; and execute the second I/O call on the determined block addresses of one or more blocks of the first one of the first plurality of channels which are associated with the one or more block addresses of the virtual address space of the second application.

12. A system according to claim 11, wherein association of the block addresses of the virtual address space of the first application with block addresses of one or more blocks of the first one of the first plurality of channels and with block addresses of one or more blocks of the second one of the first plurality of channels comprises creating a first mapping table associated with the first application, wherein the first mapping table maps the block addresses of the virtual address space of the first application with block addresses of one or more blocks of the first one of the first plurality of channels and with block addresses of one or more blocks of the second one of the first plurality of channels, wherein association of block addresses of the virtual address space of the second application with block addresses of the second one or more blocks of the first one of the first plurality of channels and with block addresses of the second one or more blocks of the second one of the first plurality of channels comprises creating a second mapping table associated with the second application, and wherein the second mapping table maps the block addresses of the virtual address space of the second application with block addresses of the second one or more blocks of the first one of the first plurality of channels and with block addresses of the second one or more blocks of the second one of the first plurality of channels.

13. A system according to claim 6, wherein association of the block addresses of the virtual address space of the first application with block addresses of one or more blocks of the first one of the first plurality of channels and with block addresses of one or more blocks of the second one of the first plurality of channels comprises creating a mapping table associated with the first application, and wherein the mapping table maps the block addresses of the virtual address space of the first application with block addresses of one or more blocks of the first one of the first plurality of channels and with block addresses of one or more blocks of the second one of the first plurality of channels.

14. A computer-implemented method comprising:
receiving a request from a first application to create a virtual open-channel solid state drive associated with a first bandwidth and first capacity;
in response to the request, associating block addresses of a virtual address space of the first application with block addresses of one or more blocks of a first one of a first plurality of channels of a first open-channel solid state drive and with block addresses of one or more blocks of a second one of a second plurality of channels of a second open-channel solid state drive;
receiving, from the first application, a first I/O call associated with one or more block addresses of the virtual address space;
determining block addresses of one or more blocks of the first one of the first plurality of channels which are associated with the one or more block addresses of the virtual address space; and
executing the first I/O call on the determined block addresses of one or more blocks of the first one of the first plurality of channels.

15. A method according to claim 14, wherein associating block addresses of the virtual address space of the first application with block addresses of one or more blocks of the first one of the first plurality of channels and with block addresses of one or more blocks of the second one of the second plurality of channels comprises:
associating block addresses of the virtual address space of the first application with block addresses of one or more blocks of the first one of the first plurality of channels, with block addresses of one or more blocks of the second one of the second plurality of channels, and with block addresses of one or more blocks of a third one of the first plurality of channels.

16. A method according to claim 15, further comprising:
receiving, from the first application, a second I/O call associated with a second one or more block addresses of the virtual address space;
determining block addresses of one or more blocks of the third one of the first plurality of channels which are associated with the second one or more block addresses of the virtual address space; and
executing the second I/O call on the determined block addresses of one or more blocks of the third one of the first plurality of channels.

17. A method according to claim 14, wherein the second open-channel solid state drive is located remote from the first open-channel solid state drive.

18. A method according to claim 14, further comprising:
receiving, from the first application, a second I/O call associated with a second one or more block addresses of the virtual address space;
determining block addresses of one or more blocks of the second one of the second plurality of channels which are associated with the second one or more block addresses of the virtual address space; and
executing the second I/O call on the determined block addresses of one or more blocks of the second one of the second plurality of channels.

19. A method according to claim 14, further comprising:
receiving a request from a second application to create a second virtual open-channel solid state drive associated with a second bandwidth and second capacity;
in response to the request, associating block addresses of a virtual address space of the second application with block addresses of a second one or more blocks of the first one of the first plurality of channels and with block addresses of a second one or more blocks of the second one of the second plurality of channels;
receiving, from the second application, a second I/O call associated with one or more block addresses of the virtual address space of the second application;
determining block addresses of one or more blocks of the second one of the second plurality of channels which are associated with the one or more block addresses of the virtual address space of the second application; and
executing the second I/O call on the determined block addresses of one or more blocks of the second one of the second plurality of channels which are associated with the one or more block addresses of the virtual address space of the second application.

20. A method according to claim 19, wherein associating the block addresses of the virtual address space of the first application with block addresses of one or more blocks of the first one of the first plurality of channels and with block addresses of one or more blocks of the second one of the second plurality of channels comprises creating a first mapping table associated with the first application,
wherein the first mapping table maps the block addresses of the virtual address space of the first application with block addresses of one or more blocks of the first one of the first plurality of channels and with block addresses of one or more blocks of the first one of the second plurality of channels,
wherein associating the block addresses of the virtual address space of the second application with block addresses of the one or more blocks of the second one of the first plurality of channels and with block addresses of the one or more blocks of the second one of the second plurality of channels comprises creating a second mapping table associated with the second application, and
wherein the second mapping table maps the block addresses of the virtual address space of the second application with block addresses of the one or more blocks of the second one of the first plurality of channels and with block addresses of the one or more blocks of the second one of the second plurality of channels.

* * * * *